(12) United States Patent
Yamakawa (10) Patent No.: US 8,810,861 B2
(45) Date of Patent: Aug. 19, 2014

(54) IMAGE PROCESSING APPARATUS, IMAGE NOISE DETECTING METHOD, AND COMPUTER-READABLE RECORDING MEDIUM WHICH AVERAGES PIXEL VALUES OF MULTIPLE PIXELS ALIGNED IN THE SUB-SCANNING DIRECTION

(75) Inventor: Shinji Yamakawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 173 days.

(21) Appl. No.: 13/463,163

(22) Filed: May 3, 2012

(65) Prior Publication Data

US 2012/0293843 A1 Nov. 22, 2012

(30) Foreign Application Priority Data

May 16, 2011 (JP) ................................. 2011-109052

(51) Int. Cl.
*H04N 1/409* (2006.01)
*H04N 1/04* (2006.01)

(52) U.S. Cl.
USPC ............................ 358/3.26; 358/463; 358/474

(58) Field of Classification Search
CPC .................................................... H04N 1/4097
See application file for complete search history.

(56) References Cited

U.S. PATENT DOCUMENTS

| | | | |
|---|---|---|---|
| 5,204,752 A | 4/1993 | Yamakawa | |
| 5,206,718 A | 4/1993 | Yamakawa | |
| 5,444,518 A | 8/1995 | Hashiguchi et al. | |
| 5,801,844 A | 9/1998 | Yamakawa et al. | |
| 5,809,366 A | 9/1998 | Yamakawa et al. | |
| 5,892,595 A | 4/1999 | Yamakawa et al. | |
| 6,014,462 A | 1/2000 | Yamakawa | |
| 6,655,861 B2 | 12/2003 | Yamakawa | |
| 6,965,695 B2 | 11/2005 | Yamakawa | |
| 7,085,013 B2 | 8/2006 | Yamakawa | |
| 7,139,100 B2 | 11/2006 | Yamakawa | |
| 7,663,783 B2 | 2/2010 | Yamakawa | |
| 8,055,084 B2 | 11/2011 | Hasegawa et al. | |
| 2005/0157351 A1* | 7/2005 | Matsuda | 358/474 |
| 2008/0232683 A1 | 9/2008 | Itoh et al. | |
| 2009/0244657 A1* | 10/2009 | Arima | 358/483 |
| 2009/0324068 A1 | 12/2009 | Yamakawa | |

FOREIGN PATENT DOCUMENTS

| | | |
|---|---|---|
| JP | 2002-247352 | 8/2002 |
| JP | 3631134 | 12/2004 |
| JP | 2008-99129 | 4/2008 |
| JP | 4407200 | 11/2009 |

* cited by examiner

*Primary Examiner* — Scott A Rogers
(74) *Attorney, Agent, or Firm* — Oblon, Spivak, McClelland, Maier & Neustadt, L.L.P.

(57) ABSTRACT

An image processing apparatus includes a reflection member configured to reflect scanning light; a scanner unit configured to scan a document to generate image data and scan the reflection member with the scanning light to generate detection-reference image data; and a detecting unit configured to detect image noise in the generated detection-reference image data in a detection range of a desired number of contiguous pixels in a sub-scanning direction so that the image noise extending in the sub-scanning direction of the generated detection-reference image is detected.

4 Claims, 6 Drawing Sheets

FIG.7

IMAGE PROCESSING APPARATUS, IMAGE NOISE DETECTING METHOD, AND COMPUTER-READABLE RECORDING MEDIUM WHICH AVERAGES PIXEL VALUES OF MULTIPLE PIXELS ALIGNED IN THE SUB-SCANNING DIRECTION

CROSS-REFERENCE TO RELATED APPLICATIONS

The present application claims priority to and incorporates by reference the entire contents of Japanese Patent Application No. 2011-109052 filed in Japan on May 16, 2011.

BACKGROUND OF THE INVENTION

1. Field of the Invention

The present invention relates to an image processing apparatus, an image noise detecting method, and a computer-readable recording medium.

2. Description of the Related Art

Conventionally performed is document scanning using an image processing apparatus, such as a multifunction peripheral (MFP), to perform copying, facsimile transmission, distribution of image data over a network, and the like. Such an image processing apparatus generates image data by conveying a document to be scanned using an automatic document feeder (ADF), illuminating the document being conveyed with light, and receiving light reflected from the document with a charge coupled device (CCD) image sensor. However, this type of image processing apparatus can undesirably produce image noise such as streaks (hereinafter, "streak image noise") extending in the sub-scanning direction in image data generated by scanning when document scanning is performed with dust on an optical path of scanning light that is to be received by the CCD image sensor.

In this regard, various techniques for detecting such streak image noise that can be produced during scanning have been proposed. For instance, Japanese Patent Application Laid-open No. 2008-99129 discloses an image reading apparatus that detects streak image noise extending in the sub-scanning direction. When noise is detected in pixels on a series of three main-scanning lines that are contiguous in the sub-scanning direction, this image reading apparatus determines that these lines have streak image noise extending in the sub-scanning direction.

Figure 7:
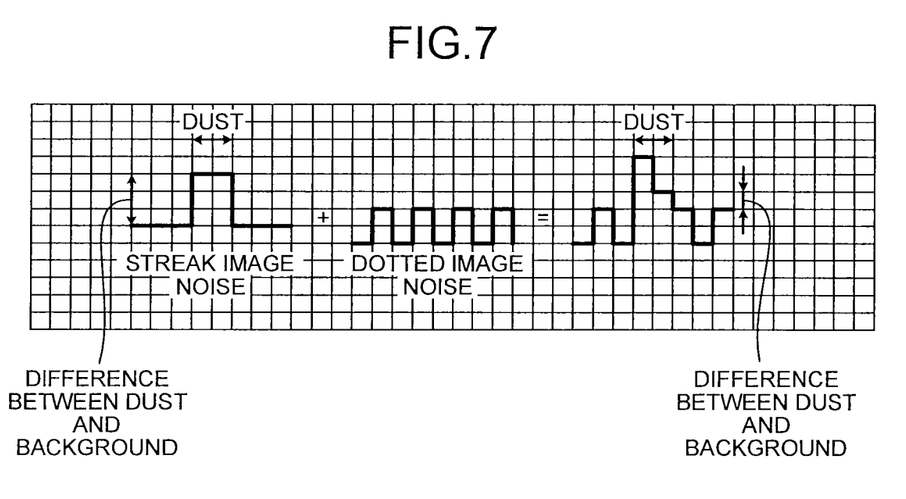
FIG. 7 is a diagram illustrating density contrast between streak image noise and dotted image noise in density.

However, other image noise than the streak image noise can be produced in image data during document scanning when the image data is generated by scanning. Examples of the other image noise include dotted image noise which is interspersed minute image noise. The image processing apparatus that uses the conventional detection technique described above does not take an influence by such other image noise into account. Accordingly, the image processing apparatus can possibly mistake such other image noise for streak image noise. Furthermore, when dotted image noise is produced in image data, density contrast between streak image noise and the dotted image noise becomes small as illustrated in FIG. 7. This disadvantageously lowers detection accuracy of the streak image noise.

Therefore, there is a need for an image processing apparatus capable of highly-accurate detection of streak image noise resulting from dust on an optical path of scanning light unaffected by other image noise that can be produced during document scanning.

SUMMARY OF THE INVENTION

It is an object of the present invention to at least partially solve the problems in the conventional technology.

According to an embodiment, there is provided an image processing apparatus that includes a reflection member configured to reflect scanning light; a scanner unit configured to scan a document to generate image data and scan the reflection member with the scanning light to generate detection-reference image data; and a detecting unit configured to detect image noise in the generated detection-reference image data in a detection range of a desired number of contiguous pixels in a sub-scanning direction so that the image noise extending in the sub-scanning direction of the generated detection-reference image is detected.

According to another embodiment, there is provided a method for detecting image noise, performed by an image processing apparatus. The method includes scanning a reflection member included in the image processing apparatus to generate detection-reference image data with scanning light; and detecting image noise in the generated detection-reference image data in a detection range of a desired number of contiguous pixels in a sub-scanning direction so that the image noise extending in the sub-scanning direction of the generated detection-reference image is detected.

According to still another embodiment, there is provided a non-transitory computer-readable recording medium with an executable program stored thereon. The program instructs a processor of an image processing apparatus to perform scanning a reflection member included in the image processing apparatus to generate detection-reference image data with scanning light; and detecting image noise in the generated detection-reference image data in a detection range of a desired number of contiguous pixels in a sub-scanning direction so that the image noise extending in the sub-scanning direction of the generated detection-reference image is detected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
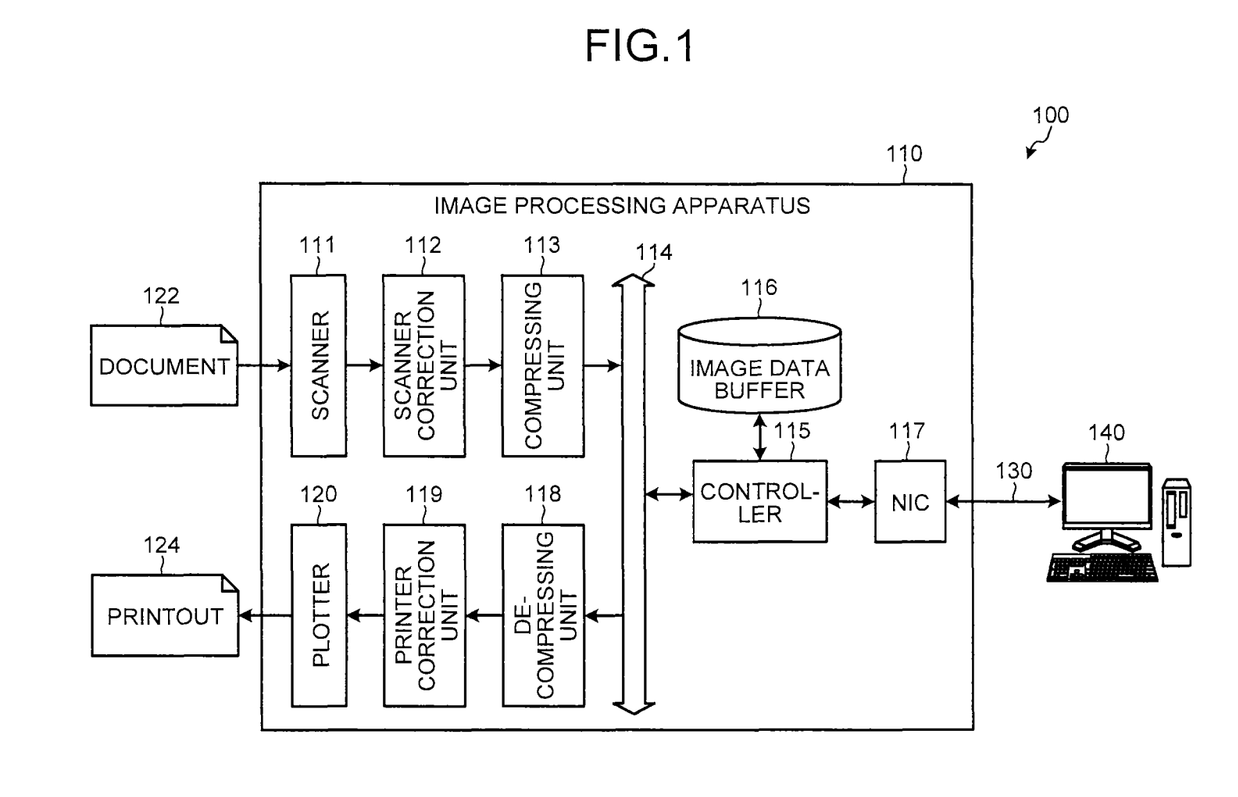
FIG. 1 is a diagram illustrating an image processing system according to a first embodiment of the present invention.

Preferred embodiments of the present invention are described below. It should be noted that the scope of the present invention is not limited to the embodiments described below. FIG. 1 is a diagram illustrating an image processing system according to a first embodiment of the present invention. An image processing system 100 includes an image processing apparatus 110 and an information processing apparatus 140 connected to each other via a network 130.

The image processing apparatus 110 is an MFP that has a printing function, a scanning function, and a copying function. The image processing apparatus 110 generates image data by scanning a document, prints image data on a sheet, performs facsimile transmission of the image data, and/or transmits the image data to the information processing apparatus 140 over the network 130. The image processing apparatus 110 also functions as a network printer by printing print data received from the information processing apparatus 140 on a sheet.

The image processing apparatus 110 includes a processor, a random access memory (RAM), and a hard disk drive (HDD). The image processing apparatus 110 executes a computer program described in a programming language such as assembler, C, C++, Java (registered trademark), or JavaScript (registered trademark) under the control of an operating system (OS) such as UNIX (registered trademark) or Linux (registered trademark) to construct functional units which will be described later of the first embodiment on the image processing apparatus 110. The image processing apparatus 110 can contain a browser program such as Firefox (registered trademark) as required to share data using a structured document described in a markup language such as HTML, XHTML, or XML. The image processing apparatus 110 can perform data communication with the information processing apparatus 140 according to a protocol such as Network Basic Input/Output System (NetBIOS), NetBIOS over Transmission Control Protocol/Internet Protocol (TCP/IP), TCP, Web Services for Devices (WSD), or user datagram protocol (UDP) using Simple Network Management Protocol (SNMP), for example.

The information processing apparatus 140 is an information processing apparatus such as a personal computer (PC) placed in an office or the like. The information processing apparatus 140 transmits print data or the like to the image processing apparatus 110 and causes printing to be performed and/or obtains image data generated by scanning from the image processing apparatus 110. The information processing apparatus 140 includes a single-core or multiple-core central processing unit (CPU) and includes a RAM, a read only memory (ROM), an HDD, and a network interface card (NIC). The information processing apparatus 140 transmits and receives data to and from the image processing apparatus 110 under an OS such as Windows (registered trademark), UNIX, Linux, or Mac OS (registered trademark) installable on the information processing apparatus 140.

The network 130 is a network that can include Ethernet (registered trademark) such as 1000BASE-T or 1000BASE-TX, an optical network, or a wireless network in accordance with the IEEE 802.11 or the like standard. The network 130 may include a wide area network such as the Internet constructed in a secure environment using a virtual private network (VPN) or the like in addition to a local area network (LAN).

In the first embodiment illustrated in FIG. 1, the image processing apparatus 110 includes a scanner 111, a scanner correction unit 112, and a compressing unit 113.

The scanner 111 includes a light source device, a mirror, and a CCD image sensor. The scanner 111 generates analog image data by scanning a document 122 conveyed by an automatic document feeder (ADF) and makes analog-to-digital (A/D) conversion from the analog image into digital image data (hereinafter, "document image data"). The scanner 111 also generates image data (hereinafter, "detection-reference image data") for use in image noise detection by scanning a white guide situated above a position where the document 122 is conveyed rather than the document 122 and making A/D conversion of analog image data obtained by scanning the white guide. The white guide is a reflection member that can reflect scanning light that is to illuminate the document 122 being conveyed. The scanner 111 transmits the document image data and the detection-reference image data to the scanner correction unit 112.

In the first embodiment, the scanner 111 generates the detection-reference image data by performing preliminary scanning before the scanner 111 scans the document 122 to generate the document image data. In another embodiment, the scanner 111 may generate the document image data by scanning the document 122 and thereafter generate the detection-reference image data by performing preliminary scanning.

The scanner correction unit 112 is a functional unit that detects image noise in the image data generated by the scanner 111 and performs various image processing. The scanner correction unit 112 detects image noise using the detection-reference image data and performs image processing such as image noise removal on the document image data using a result of the image noise detection. The scanner correction unit 112 will be described in detail later with reference to FIG. 2.

In the first embodiment, image noise detection is performed using the detection-reference image data that is generated by scanning the white guide. In another embodiment, image noise detection may be performed using detection-reference image data that is generated by scanning a guide of color other than white. In still another embodiment, image noise detection may be performed using detection-reference image data that is generated by scanning a white sheet or a sheet of other single color.

The compressing unit 113 compresses the document image data having undergone the image processing performed by the scanner correction unit 112 and transmits the compressed image data to a controller 115 over a general-purpose bus 114.

The image processing apparatus 110 includes the controller 115, an image data buffer 116, and a NIC 117.

The controller 115 is a functional unit that controls the entire image processing apparatus 110. The controller 115 performs processing responding to a request issued by a user. Examples of the request include a request for document copying, a request for printing print data, and a request for distributing image data.

When document copying is to be performed, the controller 115 buffers the document image data received from the compressing unit 113 in the image data buffer 116. Thereafter, the controller 115 obtains the document image data from the image data buffer 116 in a first-in, first out (FIFO) manner and transmits the document image data to a decompressing unit 118 over the general-purpose bus 114.

When the document image data is to be distributed, the controller 115 buffers the document image data received from the compressing unit 113 in the image data buffer 116. Thereafter, the controller 115 obtains the document image data from the image data buffer 116 in the FIFO manner and decompresses the document image data. The controller 115 converts a format of the decompressed document image data into one of various image data formats such as JPEG, TIFF, and GIF, while simultaneously converting resolution of the decompressed document image data, and transmits the converted document image data to the NIC 117. The NIC 117 transmits the document image data to a distribution destination which is the information processing apparatus 140 or a facsimile transmission destination over the network 130.

When a printout of print data is to be output, the controller 115 generates bitmapped image data by parsing print data received from the information processing apparatus 140 via the NIC 117 and described in a page description language (PDL). The controller 115 compresses the image data and transmits the image data to the decompressing unit 118 over the general-purpose bus 114.

The image processing apparatus 110 also includes the decompressing unit 118, a printer correction unit 119, and a plotter 120.

The decompressing unit 118 decompresses the compressed image data transmitted from the controller 115 and transmits the decompressed image data to the printer correction unit 119. The printer correction unit 119 performs various image processing on the decompressed image data according to various characteristics of the plotter 120 to thereby increase readability of components such as characters contained in the image data. More specifically, the printer correction unit 119 performs gamma correction to the image data according to frequency characteristics of the plotter 120 and also detects density contrast in the image data as an edge strength. The printer correction unit 119 performs tone correction by quantization, such as dithering or error diffusion, depending on tone characteristics of the plotter 120 and the edge strength. The plotter 120 prints the image data having undergone the image processing performed by the printer correction unit 119 on a print medium such as a sheet and then discharges a printout 124.

In the first embodiment illustrated in FIG. 1, the image processing apparatus 110 includes of the compressing unit 113 and the decompressing unit 118 each serving as a functional unit that compresses or decompresses image data. However, these functional units may be omitted when the general-purpose bus 114 has a sufficiently broad band and the image data buffer 116 has enough capacity.

Figure 2:
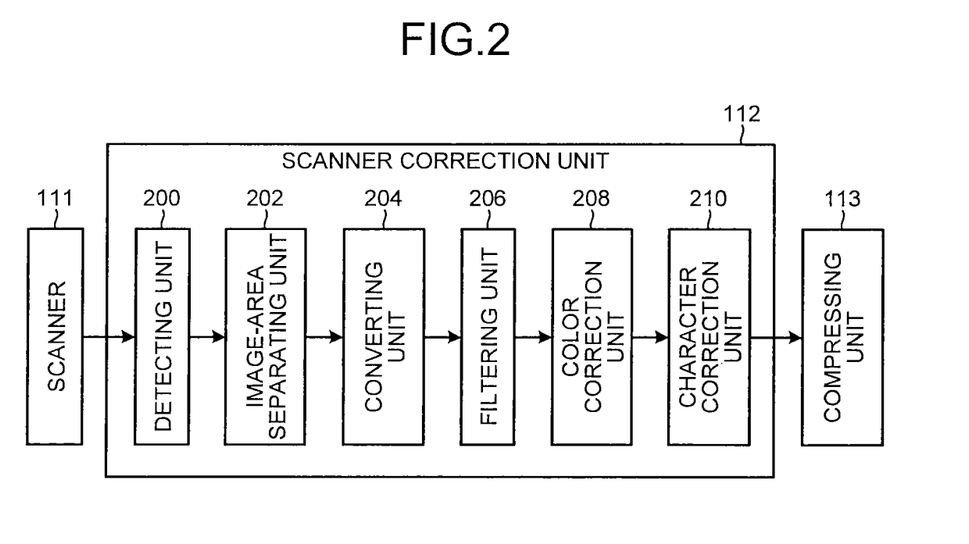
FIG. 2 is a detailed view of functional units of a scanner correction unit in an image processing apparatus according to the first embodiment.

FIG. 2 is a detailed view illustrating functional units of the scanner correction unit 112 in the image processing apparatus 110 according to the first embodiment. A functional configuration of the scanner correction unit 112 is described below with reference to FIG. 2.

The scanner correction unit 112 includes a detecting unit 200, an image-area separating unit 202, a converting unit 204, a filtering unit 206, a color correction unit 208, and a character correction unit 210.

The detecting unit 200 is a functional unit that detects whether the detection-reference image data generated by the scanner 111 has image noise and removes image noise from the document image data. The detecting unit 200 will be described in detail later with reference to FIG. 3.

The image-area separating unit 202 divides the document image data output by the detecting unit 200 into an area (hereinafter, "black-character edge area") corresponding to an edge of a black character, an area (hereinafter, "color-character edge area") corresponding to an edge of a character of a color other than black, and/or an other-than-character-edge area. More specifically, the image-area separating unit 202 determines to which area each of pixels in the image data belongs using pattern matching or the like method and assigns an image-area identifying signal for unique identification of each area to the pixel. Functional units which will be described later can identify the type of the image data area using this image-area identifying signal.

The converting unit 204 performs gamma correction on the document image data having undergone the area determination performed by the image-area separating unit 202 for conversion from reflectance data into density data.

The filtering unit 206 applies filtering to the document image data converted by the converting unit 204 according to the type of the image data area. More specifically, the filtering unit 206 determines the type of the area using the image-area identifying signal. The filtering unit 206 then performs sharpness enhancement on the black-character edge area and the color-character edge area of the document image data to thereby improve readability of characters. Simultaneously, the filtering unit 206 obtains density contrast in the other-than-character-edge area, which is put another way an area that contains a photograph or the like, as an edge strength and performs smoothing and sharpness enhancement on the area depending on the edge strength to thereby improve readability of characters in the photograph.

The color correction unit 208 transforms the RGB document image data into CMYBk document image data. More specifically, the filtering unit 206 transforms a black-character edge area of the document image data into single-color image data of Bk when an output image to be output by the image processing apparatus 110 is a color image. The filtering unit 206 transforms areas other than the black-character edge area, i.e. the color-character edge area and the other-than-character-edge area, of the RGB document image data into CMY document image data using a first-order-density masking method or the like, and generates Bk data by performing under color replacement (UCR) on the CMY document image data. The filtering unit 206 integrates these data pieces to thereby generate the CMYBk document image data.

The filtering unit 206 transforms the document image data into single-color luminance data of Bk using Equation (1) below when an image to be output is a monochrome image:

$$Y = 0.299 \times R + 0.587 \times G + 0.114 \times B \tag{1}$$

where R, G, and B represent a luminance value of red, that of green, and that of blue, respectively, of one pixel belonging to the document image data. Y represents a luminance value of the one pixel transformed into luminance data.

The character correction unit 210 determines the types of the areas in the document image data corrected by the color correction unit 208 using the image-area identifying signals, and applies the gamma correction to the black-character edge area and the color-character edge area to enhance contrast of character portions.

Figure 3:
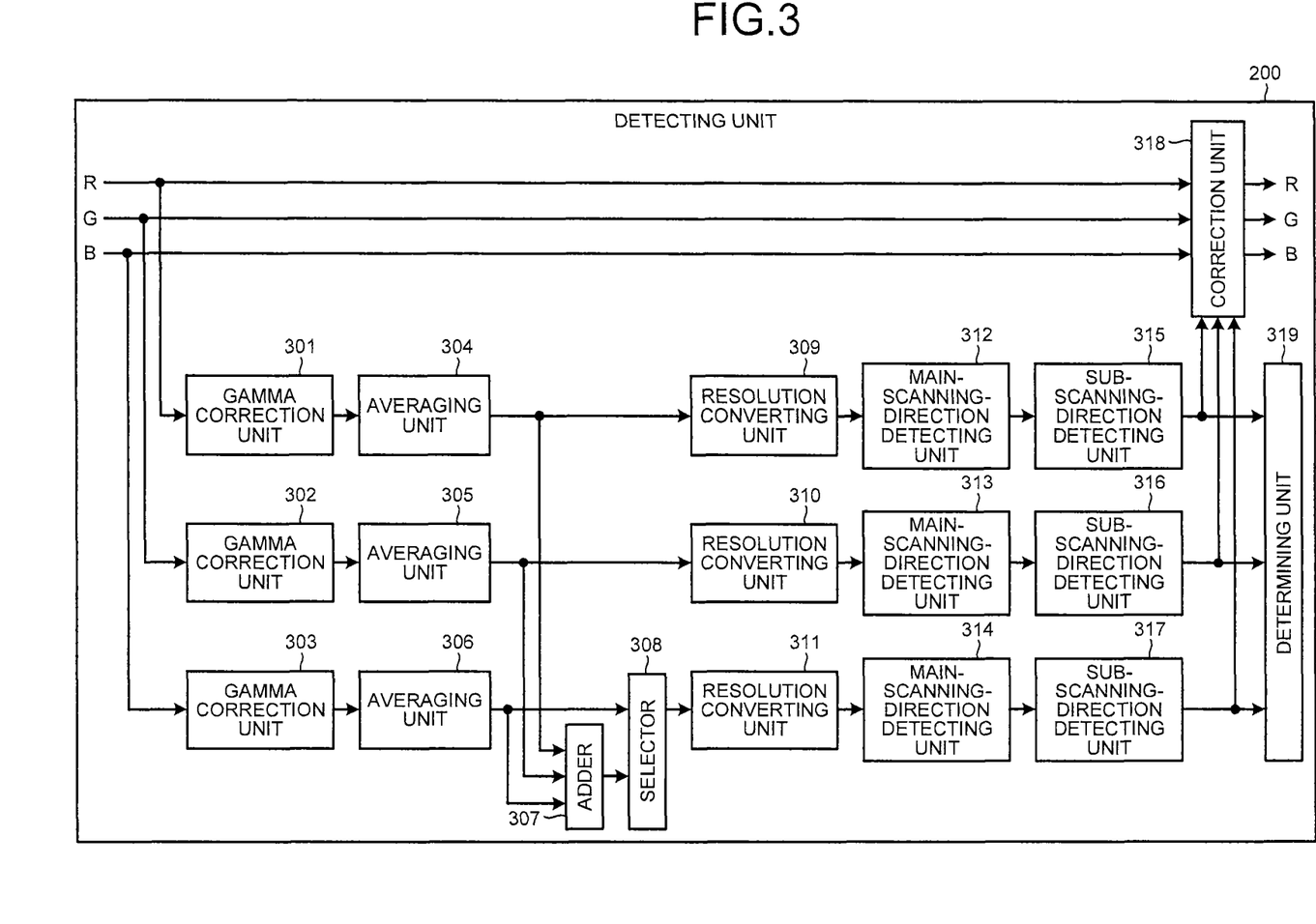
FIG. 3 is a circuit diagram of a detecting unit in the scanner correction unit of the image processing apparatus according to the first embodiment.

FIG. 3 is a circuit diagram of the detecting unit 200 in the scanner correction unit 112 of the image processing apparatus 110 according to the first embodiment. The detecting unit 200 is described below with reference to FIG. 3.

The detecting unit 200 includes gamma correction units 301, 302, and 303, averaging units 304, 305, and 306, an adder 307, and a selector 308.

Each of the gamma correction units 301, 302, and 303 is a functional unit that performs gamma correction on the corresponding one of color components of input data which is the RGB detection-reference image data generated by the scanner 111 using a predetermined lookup table. The gamma correction units 301, 302, and 303 perform gamma correction on an R component, a G component, and a B component, respectively, of the detection-reference image data. In the first embodiment, lookup tables with which the input data is to be output as it is are used. Accordingly, the gamma correction units 301, 302, and 303 output the detection-reference image data, or the input data, on which no modification is made to the averaging units 304, 305, and 306. In another embodiment, the gamma correction units 301, 302, and 303 may be omitted.

Each of the averaging units 304, 305, and 306 is a functional unit that averages luminance values of pixels that form a single sub-scanning line among pixels corresponding to the detection-reference image data output by the corresponding one of the gamma correction units 301, 302, and 303. The averaging unit 304, the averaging unit 305, and the averaging unit 306 average luminance values of the R component of eight pixels that are aligned in the sub-scanning direction of the detection-reference image data, those of the G component, and those of the B component, respectively. The number of pixels of which luminance values are to be averaged can be changed depending on a data size of an image to be scanned. For example, in another embodiment, luminance values of 16 pixels that are aligned in the sub-scanning direction may be averaged when the image is large in size.

The averaging units 304, 305, and 306 remove dotted image noise by averaging pixels that are aligned in the sub-scanning direction of the detection-reference image data containing various types of image noise in this manner so that streak image noise extending in the sub-scanning direction can be detected accurately.

The adder 307 generates luminance data by adding the averaged color components of the detection-reference image data output by the averaging units 304, 305, and 306. The selector 308 selectively outputs the image data obtained from any one of the averaging unit 306 and the adder 307 to a resolution converting unit 311. More specifically, the selector 308 outputs the output data of the averaging unit 306 to the resolution converting unit 311 when a color image is to be output by the image processing apparatus 110. On the other hand, the selector 308 outputs the luminance data generated by the adder 307 to the resolution converting unit 311 when a monochrome image is to be output.

The detecting unit 200 includes resolution converting units 309 and 310, the resolution converting unit 311, main-scanning-direction detecting units 312, 313, and 314, sub-scanning-direction detecting units 315, 316, and 317, a correction unit 318, and a determining unit 319.

The resolution converting units 309, 310, and 311 convert resolution in the main-scanning direction of the detection-reference image data. More specifically, the resolution converting units 309, 310, and 311 convert resolution in the main-scanning direction of the detection-reference image data received from the averaging units 304 and 305 and the selector 308, respectively, to a lower resolution. In the first embodiment, each of the resolution converting units 309, 310, and 311 converts resolution in the main-scanning direction into the same resolution into which the controller 115 performs resolution conversion. Thus, decreasing density of image noise can be achieved. Meanwhile, resolution in the sub-scanning direction is not changed.

Each of the main-scanning-direction detecting units 312, 313, and 314 is a functional unit that determines whether there is image noise extending in the main-scanning direction on main-scanning lines of the detection-reference image data. The main-scanning-direction detecting units 312, 313, and 314 perform image noise detection on the detection-reference image data received from the resolution converting units 309, 310, and 311, respectively, for each of the main-scanning lines using density contrast between a target pixel and its peripheral pixels. This image noise detection is orderly performed one by one from a pixel located at an end of the image data.

More specifically, each of the main-scanning-direction detecting units 312, 313, and 314 determines that a target pixel is image noise when the target pixel satisfies any one of a first condition and a second condition. The first condition is that a density of the target pixel is equal to or greater than a threshold value thd1, and the density of the target pixel is higher than a density of an immediately preceding pixel on a main-scanning line where the target pixel is located by a threshold value thdd. The second condition is that the pixel immediately preceding the target pixel on the main-scanning line has been determined as image noise, and the density of the target pixel is equal to or greater than a threshold value thd2.

Each of the threshold values thd1 and thd2 is a value indicating a density of streak image noise resulting from dust on the optical path of the scanning light. The value of thd1 and the value of thd2 vary among the main-scanning-direction detecting units 312, 313, and 314 that use the threshold values. Each of the main-scanning-direction detecting units 312, 313, and 314 uses a pixel value of the R component, that of the G component, and that the B component, respectively, of streak image noise as the threshold values. The value of thd1 is greater than the value of thd2. Meanwhile, thdd is a value indicating the difference in density between the target pixel and the immediately preceding pixel on the main-scanning line where the target pixel is located. The value of thdd can be around 10, e.g. from 6 to 12, in an embodiment that uses 8-bit image signals with which 256 shades can be expressed.

Each of the sub-scanning-direction detecting units 315, 316, and 317 is a functional unit that determines whether there is image noise extending in the sub-scanning direction on the sub-scanning lines of the detection-reference image data. The sub-scanning-direction detecting units 315, 316, and 317 perform image noise detection on the image data received from the main-scanning-direction detecting units 312, 313, and 314, respectively, for each of the sub-scanning lines using reflectance of each of the pixels corresponding to the image data.

More specifically, each of the sub-scanning-direction detecting units 315, 316, and 317 determines absence or presence of image noise extending in a sub-scanning line by determining whether an average value of reflectance of a desired number of contiguous pixels forming the sub-scanning line is equal to or greater than a predetermined threshold value. In the first embodiment, the sub-scanning-direction detecting units 315, 316, and 317 perform image noise detection on a per-detection-range basis. The detection range is pixels the number of which is equal to or more than twice that of the pixels that are averaged by the averaging unit 304 in one averaging operation.

Each of the sub-scanning-direction detecting units 315, 316, and 317 transmits a notice indicating that the detection-reference image data has image noise extending in the sub-scanning direction and position coordinates of pixels having the image noise to the determining unit 319 when the detection is complete for all the sub-scanning lines in the detection-reference image data.

The correction unit 318 is a functional unit that corrects the document image data based on results of the image noise detections performed using the detection-reference image data. More specifically, the correction unit 318 corrects pixel values of target pixels determined to have image noise by any one of the main-scanning-direction detecting units 312, 313, and 314 and the sub-scanning-direction detecting units 315, 316, and 317 among the pixels belonging to the document image data. In the first embodiment, the correction unit 318 makes this correction by replacing a pixel value of each of the target pixels having the image noise with an average value of pixel values of its peripheral pixels.

The determining unit 319 determines whether there is a possibility that image noise extending in the sub-scanning direction is formed in the document image data based on results of the detections performed by the sub-scanning-direction detecting units 315, 316, and 317. The determining unit 319 transmits a result of this determination and position coordinates of pixels having image noise to the scanner 111 so that the scanner 111 can change a document scanning position. Alternatively, the determining unit 319 may transmit the result of this determination to a control unit of an operating panel of the image processing apparatus 110 so that a warning that image noise may be formed in the image data is displayed on the operating panel. It is also possible, when image processing is to be performed on a target area of the image data by another functional unit in the image processing apparatus 110, to remove pixel(s) corresponding to the pixels having the image noise from the target area utilizing the result of the determination made by the determining unit 319 and the position coordinates of the pixels having the image noise.

In the first embodiment, the main-scanning-direction detecting units 312, 313, and 314 perform the image noise detection described above when an image to be output is a color image. The sub-scanning-direction detecting units 315, 316, and 317 then perform the image noise detection described above. Subsequently, the correction unit 318 makes correction to pixels in the RGB document image data corresponding to a pixel(s) of which one or more color components are determined to have image noise by the sub-scanning-direction detecting units 315, 316, and 317 among pixels of the detection-reference image data. For example, when the sub-scanning-direction detecting unit 315 has determined that the R component of a certain pixel of the detection-reference image data has image noise, the correction unit 318 corrects the R component of a pixel of the document image data corresponding to the certain pixel. When the sub-scanning-direction detecting unit 316 or 317 has determined that the G or B component of a certain pixel of the detection-reference image data has image noise, the correction unit 318 corrects the G or B component of a pixel of the document image data corresponding to the certain pixel. The determining unit 319 determines that image noise extending in the sub-scanning direction is to be formed in the document image data when the result of the detection of any one the sub-scanning-direction detecting units 315, 316, and 317 indicates that the document image data has image noise.

The main-scanning-direction detecting unit 314 performs image noise detection using the luminance data generated by the adder 307 when an image to be output is a monochrome image. Then, the sub-scanning-direction detecting unit 317 performs image noise detection using the luminance data generated by the adder 307. It should be noted that the sub-scanning-direction detecting units 315 and 316 do not perform image noise detection. When the sub-scanning-direction detecting unit 317 detects that a certain pixel of the detection-reference image data has image noise, the correction unit 318 corrects a pixel of the RGB document image data corresponding to the certain pixel. Subsequently, the determining unit 319 determines that image noise extending in the sub-scanning direction is to be formed in the document image data when the result of the detection performed by the sub-scanning-direction detecting unit 317 indicates that there is image noise, or, more specifically, the G component of the image data has image noise.

Figure 4:
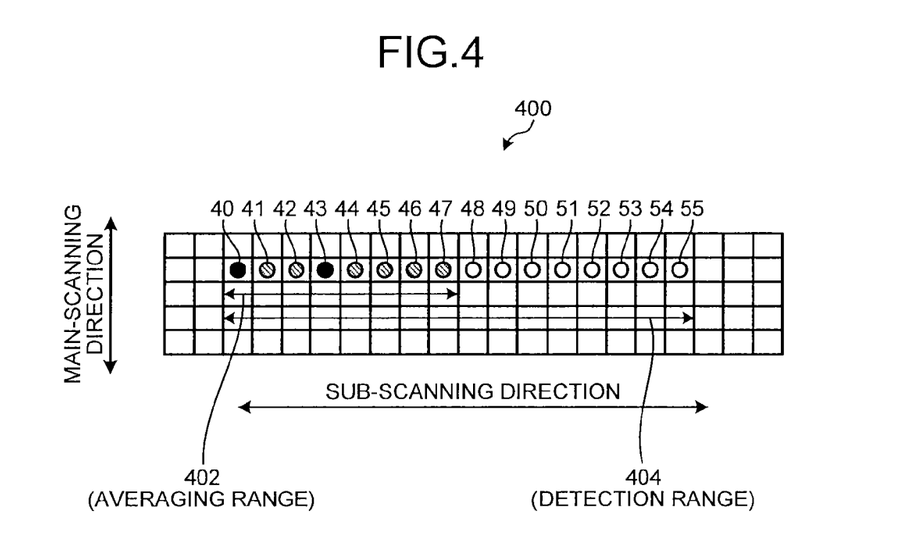
FIG. 4 is a conceptual diagram illustrating a method for the image processing apparatus according to the first embodiment for detecting image noise extending in the sub-scanning direction.

FIG. 4 is a conceptual diagram illustrating a method for the image processing apparatus 110 according to the first embodiment for detecting image noise extending in the sub-scanning direction. The method for detecting image noise extending in the sub-scanning direction is described below with reference to FIG. 4.

Referring to FIG. 4, an averaging range 402, which is a range in which the scanner correction unit 112 of the image processing apparatus 110 averages in the sub-scanning direction, is pixels 40 to 47 which are pixels corresponding to image data 400 and contiguous in the sub-scanning direction; image-noise detection range 404 is 16 pixels corresponding to the image data 400 and contiguous in the sub-scanning direction.

The pixels 40 and 43 of the image data 400 correspond to high-density image noise; the pixels 41, 42, and 44 to 47 correspond to low-density image noise; the pixels 48 to 55 are pixels having no image noise. An average value of reflectance of the image-noise detection range 404 is 63.75% when it is assumed that reflectance of the pixels having the high-density image noise is 10%, the reflectance of the pixels having the low-density image noise is 60%, the reflectance of the pixels having no image noise is 80%, and a threshold value for detection of image noise extending in the sub-scanning direction is 50%. This average value is higher than the reflectance of the threshold value. Accordingly, the image processing apparatus 110 determines that the detection range 404 has no image noise extending the sub-scanning direction.

However, 47.5% which is lower than the threshold value is obtained as an average value of reflectance when the detection range is set to the pixels 40 to 47 that is the same as the averaging range 402 in the first embodiment illustrated in FIG. 4. Hence, the image processing apparatus 110 makes an error determination that the image data 400 has streak image noise even when the image data 400 actually has only low-density image noise at six positions and high-density image noise, or dust, at two positions but has no image noise extending in the sub-scanning direction. Accordingly, by setting the detection range to be equal to or more than twice as large as the averaging range as in the image processing apparatus of the first embodiment, detection accuracy of streak image noise extending in the sub-scanning direction can be enhanced.

Figure 5:
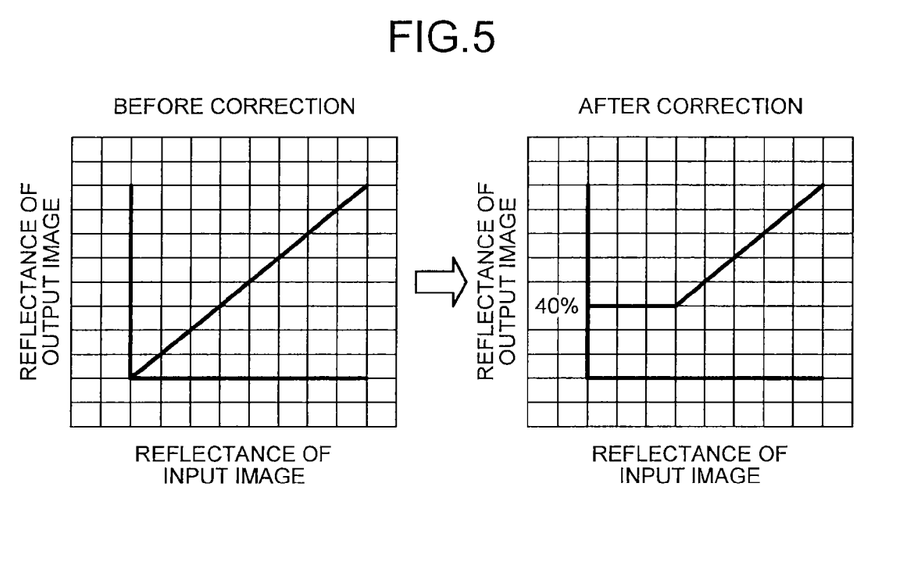
FIG. 5 is a diagram illustrating how reflectance of an input image is changed by gamma correction performed by the detecting unit in the scanner correction unit of the image processing apparatus according to a second embodiment of the present invention.

FIG. 5 is a diagram illustrating how reflectance of an input image is changed by image processing performed by the gamma correction units 301, 302, and 303 of the detecting unit 200 of the scanner correction unit 112 of the image processing apparatus according to a second embodiment of the present invention. As illustrated in FIG. 5, the gamma correction units 301, 302, and 303 correct reflectance of pixels of which reflectance is lower than a predetermined reflectance among pixels belonging to the input image to take dotted image noise that can be developed during scanning into consideration in the second embodiment.

More specifically, the predetermined reflectance is obtained by subtracting α, which is a value employed to take high-density image noise into consideration, from the threshold value for use by the sub-scanning-direction detecting units 315, 316, and 317 in the image noise detection. The gamma correction units 301, 302, and 303 correct reflectance of every pixel whose reflectance is lower than the predetermined reflectance to the predetermined reflectance. When, for example, the image data 400 illustrated in FIG. 4 is assumed as the input image and corrected on an assumption that the threshold value is 50% and α is 10%, the gamma correction units 301, 302, and 303 correct 10%, which is the reflectance of the pixels corresponding to the high-density image noise, to 40%. In a case where the sub-scanning-direction detecting units 315, 316, and 317 perform image noise detection using the thus-corrected detection-reference image data, an average value of reflectance of the detection range is 55% when the detection range is the same as the averaging range 402 (the pixels 40 to 47). This average value is higher than the reflectance of the threshold value. Accordingly, the sub-scanning-direction detecting units 315, 316, and 317 determine that the detection range 404 has no image noise extending the sub-scanning direction.

In contrast, in a case where the reflectance correction described above is not applied, an average value of reflectance is 47.5% when the detection range is the same as the averaging range 402 (the pixels 40 to 47) in the first embodiment illustrated in FIG. 4 as described above with reference to FIG. 4. Accordingly, the sub-scanning-direction detecting units 315, 316, and 317 undesirably make an error determination that there is image noise extending in the sub-scanning direction in the detection range. However, according to the second embodiment, the reflectance correction is made to the detection-reference image data which is the input image before the image noise detection. Accordingly, even when the image noise detection range is equal in size with the averaging range, detection accuracy of streak image noise extending in the sub-scanning direction can be enhanced unaffected by high-density dotted image noise.

In another embodiment, the image processing apparatus 110 may make reflectance correction to the detection-reference image data and thereafter perform image noise detection using a detection range that is equal to or more than twice as large as the averaging range 402 illustrated in FIG. 4.

Figure 6:
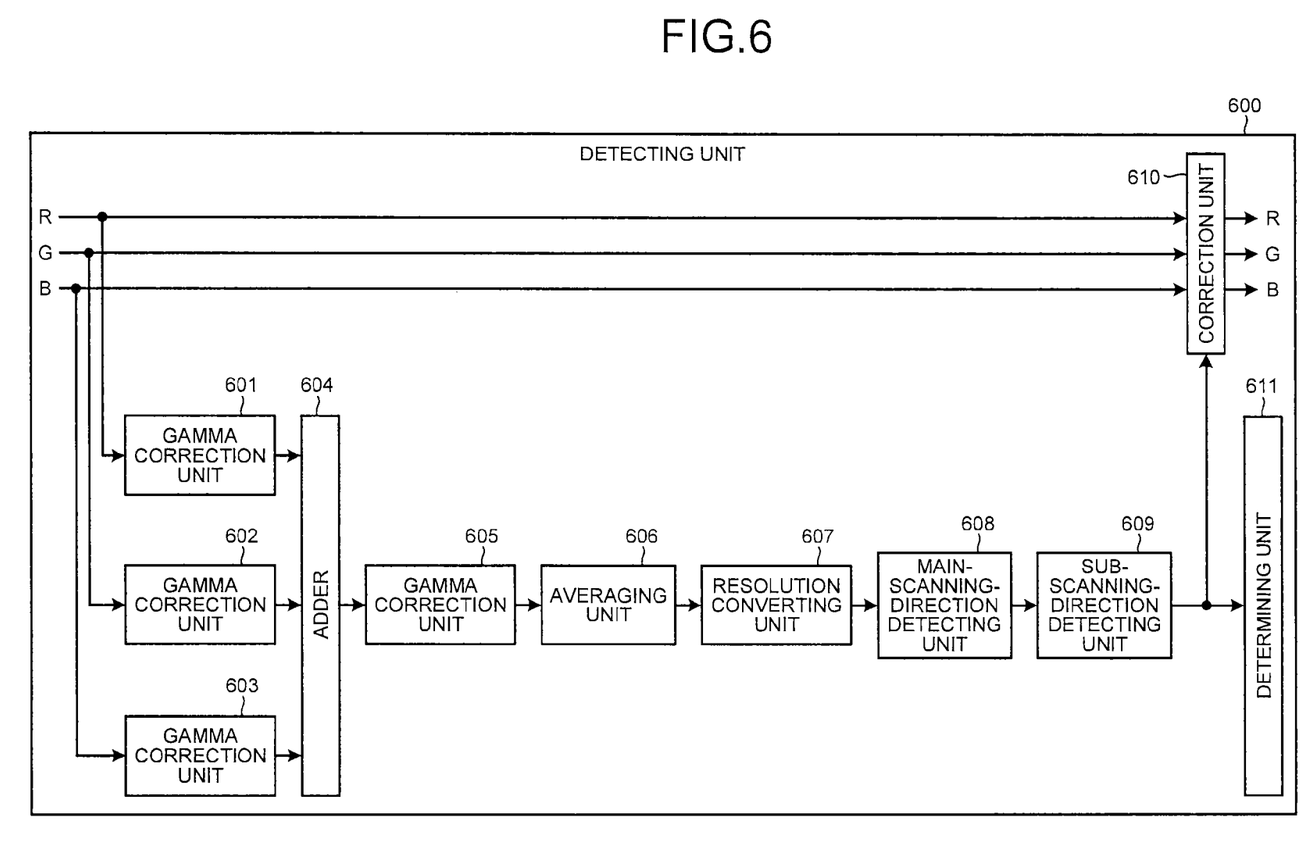
FIG. 6 is a circuit diagram of a detecting unit in the scanner correction unit of the image processing apparatus according to a third embodiment of the present invention.

FIG. 6 is a circuit diagram of a detecting unit in the scanner correction unit of the image processing apparatus according to a third embodiment of the present invention. A detecting unit 600 that performs image noise detection when an image to be output is a monochrome image is described below with emphasis on what makes the detecting unit 600 to differ from the detecting unit 200 illustrated in FIG. 3.

The detecting unit 600 includes gamma correction units 601, 602, and 603, an adder 604, a gamma correction unit 605, an averaging unit 606, a resolution converting unit 607, a main-scanning-direction detecting unit 608, a sub-scanning-direction detecting unit 609, a correction unit 610, and a determining unit 611.

The gamma correction units 601, 602, and 603 are functional units that apply gamma correction to input data which is the RGB detection-reference image data using predetermined lookup tables. The adder 604 generates luminance data by adding color components of the image data corrected by the gamma correction units 601, 602, and 603. The gamma correction units 601, 602, and 603 and the adder 604 of the third embodiment generate luminance data using the method with Equation (1) described above.

The gamma correction unit 605 makes gamma correction to the image data which is the luminance data in a manner similar to the gamma correction made by the gamma correction units 301, 302, and 303 described above with reference to FIG. 5.

The averaging unit 606 averages luminance values of multiple pixels corresponding to a single sub-scanning line among pixels belonging to the detection-reference image data corrected by the gamma correction unit 605. In the third embodiment, the averaging unit 606 averages eight pixels that are aligned in the sub-scanning direction as in the case of the averaging units 304, 305, and 306. The number of pixels of which luminance values are to be averaged can be changed depending on a data size of an image to be scanned. For example, in another embodiment, luminance values of 16 pixels that are aligned in the sub-scanning direction may be averaged when the image is large in size.

The resolution converting unit 607 converts resolution in the main-scanning direction of the detection-reference image data which is the luminance data and undergone the average performed by the averaging unit 606. More specifically, the resolution converting unit 607 converts resolution of the detection-reference image data received from the averaging unit 606 to a lower resolution as in the case of the resolution converting units 309, 310, and 311. Thus, decreasing density of image noise can be achieved.

The main-scanning-direction detecting unit 608 is a functional unit that determines whether there is image noise extending in the main-scanning direction on main-scanning lines of the detection-reference image data which is the luminance data and of which resolution has been converted by the resolution converting unit 607. The main-scanning-direction detecting unit 608 performs image noise detection on the detection-reference image data for each of the main-scanning lines utilizing density contrast between a target pixel and its peripheral pixels. This image noise detection is orderly performed one by one from a pixel located at an end of the detection-reference image data.

The sub-scanning-direction detecting unit 609 is a functional unit that determines whether there is image noise extending in the sub-scanning direction on sub-scanning lines of the detection-reference image data having undergone the image noise detection performed by the main-scanning-direction detecting unit 608. The sub-scanning-direction detecting unit 609 performs image noise detection on the detection-reference image data for each of the sub-scanning lines utilizing reflectance of each of the pixels belonging to the detection-reference image data as in the case of the sub-scanning-direction detecting units 315, 316, and 317.

The correction unit 610 corrects the document image data based on results of the image noise detections performed by the main-scanning-direction detecting unit 608 and the sub-scanning-direction detecting unit 609 as in the case of the correction unit 318. More specifically, the correction unit 610 makes this correction by replacing pixel values of every color component of each of the target pixels of the image noise with average pixel values of peripheral pixels of the target pixel when the main-scanning-direction detecting unit 608 and the sub-scanning-direction detecting unit 609 have determined that the document image data has image noise.

The program performed by the image processing apparatus 110, which corresponds to the functional units described above, may be provided as a computer-readable recording medium storing the program thereon, such as the RAM, the ROM, the HDD, a compact disc ROM (CD-ROM), a digital versatile disc (DVD), a magneto-optical disc (MO), flash memory, and the like.

According to the embodiments, the image processing apparatus can detect streak image noise resulting from dust on an optical path highly accurately unaffected by other image noise that can be produced during document scanning.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image processing apparatus comprising:
a reflection member configured to reflect scanning light;

a scanner unit configured to scan a document to generate image data and scan the reflection member with the scanning light to generate detection-reference image data; and a detecting unit configured to detect image noise in the generated detection-reference image data in a detection range of a desired number of contiguous pixels in a sub-scanning direction so that the image noise extending in the sub-scanning direction of the generated detection-reference image is detected, wherein:

the detecting unit includes an averaging unit that averages pixel values of multiple pixels aligned in the sub-scanning direction, and the detecting unit detects the image noise in the detection range that is at least twice as large as an averaging range of the multiple pixels to be averaged by the averaging unit.

2. The image processing apparatus according to claim 1, wherein the detecting unit detects the image noise in image data obtained by correction such that a pixel having a reflectance lower than a threshold value among pixels corresponding to the detection-reference image data has an increased reflectance.

3. A method for detecting image noise, performed by an image processing apparatus, the method comprising:

scanning a reflection member included in the image processing apparatus to generate detection-reference image data with scanning light; and detecting image noise in the generated detection-reference image data in a detection range of a desired number of contiguous pixels in a sub-scanning direction so that the image noise extending in the sub-scanning direction of the generated detection-reference image is detected, wherein:

the detecting includes an averaging that averages pixel values of multiple pixels aligned in the sub-scanning direction, and the detecting detects the image noise in the detection range that is at least twice as large as an averaging range of the multiple pixels to be averaged by the averaging.

4. A non-transitory computer-readable recording medium with an executable program stored thereon, wherein the program instructs a processor of an image processing apparatus to perform:

scanning a reflection member included in the image processing apparatus to generate detection-reference image data with scanning light; and detecting image noise in the generated detection-reference image data in a detection range of a desired number of contiguous pixels in a sub-scanning direction so that the image noise extending in the sub-scanning direction of the generated detection-reference image is detected, wherein:

the detecting includes an averaging that averages pixel values of multiple pixels aligned in the sub-scanning direction, and the detecting detects the image noise in the detection range that is at least twice as large as an averaging range of the multiple pixels to be averaged by the averaging.

\* \* \* \* \*